United States Patent
Perdomi et al.

(10) Patent No.: US 10,882,287 B2
(45) Date of Patent: *Jan. 5, 2021

(54) MULTILAYER FILM COMPRISING A POLYOLEFIN COMPOSITION

(71) Applicant: BASELL POLIOLEFINE ITALIA S.R.L., Milan (IT)

(72) Inventors: Gianni Perdomi, Ferrara (IT); Monica Galvan, Ferrara (IT); Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/613,635

(22) PCT Filed: May 3, 2018

(86) PCT No.: PCT/EP2018/061286
§ 371 (c)(1),
(2) Date: Nov. 14, 2019

(87) PCT Pub. No.: WO2018/215184
PCT Pub. Date: Nov. 29, 2018

(65) Prior Publication Data
US 2020/0189245 A1 Jun. 18, 2020

(30) Foreign Application Priority Data

May 23, 2017 (EP) .................................... 17172379

(51) Int. Cl.
*B32B 27/08* (2006.01)
*B32B 27/32* (2006.01)
*C08L 23/16* (2006.01)

(52) U.S. Cl.
CPC .............. *B32B 27/08* (2013.01); *B32B 27/32* (2013.01); *C08L 23/16* (2013.01); *B32B 2250/242* (2013.01); *B32B 2250/40* (2013.01); *B32B 2270/00* (2013.01); *B32B 2307/40* (2013.01); *B32B 2307/518* (2013.01); *C08L 2205/03* (2013.01)

(58) Field of Classification Search
CPC ...... C08L 23/10; C08L 23/16; C08L 2205/02; C08L 2205/03; C08L 2203/16
See application file for complete search history.

(56) References Cited

U.S. PATENT DOCUMENTS

| | | | | |
|---|---|---|---|---|
| 5,453,466 A | * | 9/1995 | Pellegatti | C08L 23/12 525/240 |
| 7,125,924 B2 | * | 10/2006 | Credali | C08L 23/10 524/425 |
| 7,981,982 B2 | * | 7/2011 | Cagnani | C08F 210/16 526/64 |
| 10,501,616 B2 | * | 12/2019 | Galvan | C08L 23/10 |
| 2004/0041299 A1 | * | 3/2004 | Kim | C08J 5/18 264/176.1 |
| 2015/0166778 A1 | * | 6/2015 | Fantinel | C08L 23/0815 428/36.9 |
| 2015/0232643 A1 | * | 8/2015 | Herklots | B29C 43/00 264/523 |
| 2016/0347941 A1 | * | 12/2016 | Nakajima | C08K 5/0083 |
| 2019/0160795 A1 | * | 5/2019 | Galvan | B32B 27/08 |

FOREIGN PATENT DOCUMENTS

| | | | | |
|---|---|---|---|---|
| EP | 2540499 A1 | * | 1/2013 | ............. B32B 27/34 |
| EP | 2540499 A1 | | 1/2013 | |
| WO | WO-2006062956 A2 | * | 6/2006 | ............. C08F 10/00 |
| WO | 2016207235 A1 | | 12/2016 | |
| WO | 2016207236 A1 | | 12/2016 | |
| WO | 2017202600 A1 | | 11/2017 | |

OTHER PUBLICATIONS

International Search Report and Written Opinion dated May 28, 2018 (May 28, 2018) for Corresponding PCT/EP2018/061286.

* cited by examiner

*Primary Examiner* — Michael M Dollinger

(57) ABSTRACT

A multilayer film made from or containing at least one layer made from or containing a polyolefin composition made from or containing:
- A) 5-35% by weight, based upon the total weight of the polyolefin composition, of a propylene homopolymer or a propylene ethylene copolymer;
- B) 25-50% by weight, based upon the total weight of the polyolefin composition, of a copolymer of ethylene and a $C_3$-$C_8$ alpha-olefin containing 0.1-20% by weight of $C_3$-$C_8$ alpha-olefin units; and
- C) 30-60% by weight, based upon the total weight of the polyolefin composition, of a copolymer of ethylene and propylene containing 25-75% by weight of ethylene units.

15 Claims, No Drawings

MULTILAYER FILM COMPRISING A POLYOLEFIN COMPOSITION

This application is the U.S. National Phase of PCT International Application PCT/EP2018/061286, filed May 3, 2018, claiming benefit of priority to European Patent Application No. 17172379.4, filed May 23, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to multilayer films, including cast, blown and bioriented multilayer films.

BACKGROUND OF THE INVENTION

Films made of propylene copolymers or terpolymers are useful for certain applications.

SUMMARY OF THE INVENTION

The present disclosure provides a composition made from or containing propylene-base polymers and LLDPE. In some embodiments, the composition is used for the production of multilayer films, including cast, blown and bioriented films. In some embodiments, the films have improved optical properties.

In some embodiments, the present disclosure provides a multilayer film, alternatively a blow multilayer film, made from or containing at least one layer made from or containing a polyolefin composition made from or containing:

A) 5-35% by weight, based upon the total weight of the polyolefin composition, of a propylene homopolymer or a propylene ethylene copolymer containing 90% by weight or more of propylene units; component A) containing 10% by weight or less of a fraction soluble in xylene at 25° C. ($XS_A$), both the amount of propylene units and of the fraction $XS_A$ being referred to the weight of A);

B) 20-50% by weight, based upon the total weight of the polyolefin composition, of a copolymer of ethylene and a C3-C8 alpha-olefin containing from 0.1% to 20% by weight of alpha-olefin units and containing 25% by weight or less; of a fraction soluble in xylene at 25° C. ($XS_B$), both the amount of alpha-olefin units and of the fraction $XS_B$ being referred to the weight of (B); and C) 30-60% by weight, based upon the total weight of the polyolefin composition, of a copolymer of ethylene and propylene containing from 25% to 75% by weight of ethylene units and containing from 40% to 95% by weight of a fraction soluble in xylene at 25° C. ($XS_C$), both the amount of ethylene units and of the fraction $XS_C$ being referred to the weight of (C);

wherein the amounts of (A), (B) and (C) being referred to the total weight of (A)+(B)+(C), the sum of the amount of (A)+(B)+(C) being 100.

DETAILED DESCRIPTION OF THE INVENTION

In some embodiments, the present disclosure provides a multilayer film, alternatively a multilayer blown film, made from or containing at least one layer, alternatively the core layer, made from or containing a polyolefin composition made from or containing:

A) 5-35% by weight, based upon the total weight of the polyolefin composition, alternatively 10-30% by weight; alternatively 15-25% by weight, of a propylene homopolymer or a propylene ethylene copolymer containing 90% by weight or more, alternatively 95% by weight or more; alternatively 97% by weight or more of propylene units; component A) containing 10% by weight or less, alternatively 8 wt % or less more, alternatively 6 wt % or less of a fraction soluble in xylene at 25° C. ($XS_A$), both the amount of propylene units and of the fraction $XS_A$ being referred to the weight of A);

B) 20-50% by weight, based upon the total weight of the polyolefin composition, alternatively 25-45% by weight; alternatively 30-40% by weight, of a copolymer of ethylene and a $C_3$-$C_8$ alpha-olefin containing from 0.1% to 20% by weight; alternatively from 5% to 15% by weight; alternatively from 7% to 12% by weight of alpha-olefin units and containing 25% by weight or less; alternatively from 20% by weight or less; alternatively 17% by weight or less of a fraction soluble in xylene at 25° C. ($XS_B$), both the amount of alpha-olefin units and of the fraction $XS_B$ being referred to the weight of (B); and C) 30-60% by weight, based upon the total weight of the polyolefin composition, alternatively 35-55% by weight; alternatively 40-50% by weight, of a copolymer of ethylene and propylene containing from 25% to 75% by weight; alternatively from 37% to 65% by weight; alternatively from 45% to 58% by weight of ethylene units and containing from 40% to 95% by weight of a fraction soluble in xylene at 25° C. ($XS_C$), both the amount of ethylene units and of the fraction $XS_C$ being referred to the weight of (C);

wherein the amounts of (A), (B) and (C) being referred to the total weight of (A)+(B)+(C), the sum of the amount of (A)+(B)+(C) being 100.

In some embodiments, component (A) has a melt flow rate (230° C./2.16 kg) ranging between 50 and 200 g/10 min; alternatively between 80 and 170 g/10 min.

In some embodiments, components (A)+(B) blended together have a melt flow rate (230° C./2.16 kg) between 0.1 and 70 g/10 min., alternatively between 1 and 50 g/10 min; alternatively between 8 and 40 g/10 min.

In some embodiments, component B) has a density (determined according to ISO 1183 at 23° C.) of from 0.940 to 0.965 g/cm$^3$. Component B) is an ethylene copolymer containing $C_3$-$C_8$ alpha-olefin derived units. In some embodiments, the alpha-olefin comonomers are selected from the group consisting of propylene, 1-butene, 1-pentene, 4-methyl-1-pentene, 1-hexene and 1-octene; alternatively 1-butene 1-hexene and 1-octene. In some embodiments, the alpha-olefin comonomer is 1-butene.

In some embodiments, the polyolefin composition has a melt flow rate (230° C./2.16 kg) between 0.5 to 25 g/10 min alternatively from 0.8 to 20.0 g/10 min; alternatively from 1.0 to 18.0 g/10 min.

In some embodiments, the polyolefin composition has an intrinsic viscosity [η] (measured in tetrahydronaphthalene at 135° C.) of the xylene soluble fraction at 25° C. between 1.5 to 4.0 dl/g, alternatively between 2.0 and 3.5 dl/g; alternatively between 2.1 and 2.8 dl/g.

As used herein, the term "copolymer" refers to polymers containing two kinds of comonomers, such as propylene and ethylene or ethylene and 1-butene.

In some embodiments, the polyolefin compositions are used in the production of multilayer films. In some embodiments, the multilayer films are selected from the group consisting of cast films, blown films and biaxially oriented films (BOPPs).

In some embodiments, the multilayer films have at least a layer, alternatively at least one of the core layers, made from or containing the polyolefin composition of the present disclosure. In some embodiments, each layer is formed of a polypropylene homopolymer or copolymer or polyethylene homopolymer or copolymer or other kind of polymers such as EVA.

The combination and number of layers of the multilayer structures are not limited. In some embodiments, the multilayer structure has 3-11 layers or more, alternatively 3-9 layers, alternatively 3-7 layers, alternatively 3-5 layers, with combinations including A/B/A, A/B/C, A/B/C/B/A, and A/B/C/D/C/B/A, provided that at least one core layer such as B or D is made from or contains a polyolefin composition of the present disclosure.

In certain embodiments, the number of layers of the multilayer film of the present disclosure are 3 or 5, wherein at least one core layer is made from or contains a polyolefin composition of the present disclosure. In some embodiments, structures such as A/B/A or A/B/C, wherein B is a polyolefin composition of the present disclosure, are used.

In some embodiments, the multilayer films are made via blown process. In some embodiments, the multilayer thin films have a thickness lower than 30 microns, alternatively lower than 20 microns.

In some embodiments, the polyolefin composition is prepared by a sequential polymerization, including at least three sequential steps, wherein components (A), (B) and (C) are prepared in separate subsequent steps, operating in each step, except the first step, in the presence of the polymer formed and the catalyst used in the preceding step. The catalyst is added in the first step. In some embodiments, the catalyst is active for the subsequent steps.

In some embodiments, the polymerization is selected from continuous or batch processes. In some embodiments, the polymerization is carried out in a process operating in liquid phase. In some embodiments, the process is carried out in the presence of inert diluent, in gas phase, or by mixed liquid-gas techniques In some embodiments, the polymerization is carried out in gas phase.

In some embodiments, the reaction temperature is from 50 to 100° C. In some embodiments, the reaction pressure is atmospheric or higher.

In some embodiments, the regulation of the molecular weight is carried out by using molecular weight regulators. In some embodiments, the molecular weight regulator is hydrogen.

In some embodiments, the polymerizations are carried out in the presence of a Ziegler-Natta catalyst. In some embodiments, a Ziegler-Natta catalyst is made from or contains the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from compounds of Ti, V, Zr, Cr and Hf. In some embodiments, the transition metal is supported on MgCl2.

In some embodiments, the catalysts are made from or contain the product of the reaction of the organometallic compound of group 1, 2 or 13 of the Periodic Table of elements, with a solid catalyst component made from or containing a Ti compound and an electron donor compound supported on MgCl2.

In some embodiments, the organometallic compounds are aluminum alkyl compounds.

In some embodiments, the polymer composition B) is obtained by using a Ziegler-Natta polymerization catalyst, alternatively a Ziegler-Natta catalyst supported on MgCl2, alternatively a Ziegler-Natta catalyst made from or containing the product of reaction of:

1) a solid catalyst component made from or containing a Ti compound and an electron donor (internal electron-donor) supported on MgCl2;
2) an aluminum alkyl compound (cocatalyst); and, optionally,
3) an electron-donor compound (external electron-donor).

In some embodiments, the solid catalyst component (1) contains as electron-donor a compound selected from the group consisting of ethers, ketones, lactones, compounds containing N, P and/or S atoms, and mono- and dicarboxylic acid esters.

In some embodiments, the catalysts are selected from the catalysts described in U.S. Pat. No. 4,399,054 and European Patent No. 45977.

In some embodiments, the electron-donor compounds are selected from the group consisting of phthalic acid esters and succinic acid esters. In some embodiments, the electron-donor compound is diisobutyl phthalate.

In some embodiments, the succinic acid esters are represented by the formula (I):

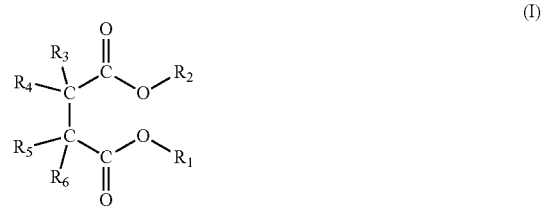

(I)

wherein the radicals R1 and R2, equal to or different from each other, are a C1-C20 linear or branched alkyl, alkenyl, cycloalkyl, aryl, arylalkyl or alkylaryl group, optionally containing heteroatoms; the radicals R3 to R6 equal to or different from each other, are hydrogen or a C1-C20 linear or branched alkyl, alkenyl, cycloalkyl, aryl, arylalkyl or alkylaryl group, optionally containing heteroatoms. In some embodiments, the radicals R3 to R6, which are joined to the same carbon atom, form a cycle.

In some embodiments, R1 and R2 are selected from the group consisting of C1-C8 alkyl, cycloalkyl, aryl, arylalkyl and alkylaryl groups. In some embodiments, R1 and R2 are selected from primary alkyls, alternatively branched primary alkyls. In some embodiments, R1 and R2 groups are selected from the group consisting of methyl, ethyl, n-propyl, n-butyl, isobutyl, neopentyl, and 2-ethylhexyl. In some embodiments, R1 and R2 groups are selected from the group consisting of ethyl, isobutyl, and neopentyl.

In some embodiments, R3 to R5 are hydrogen and R6 is a branched alkyl, cycloalkyl, aryl, arylalkyl and alkylaryl radical having from 3 to 10 carbon atoms. In some embodiments, at least two radicals from R3 to R6 are different from hydrogen and are selected from C1-C20 linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, the at least two radicals different from hydrogen are linked to different carbon atoms are (a) R3 and R5 or (b) R4 and R6.

In some embodiments, other electron-donors are the 1,3-diethers as described in published European Patent Application Nos. EP-A-361 493 and 728769.

In some embodiments, cocatalysts (2) are trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) used as external electron-donors (added to the Al-alkyl compound) are made from or contain aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine.

In some embodiments, the silicon compounds have the formula R1aR2bSi(OR3)c, where a and b are integer numbers from 0 to 2, c is an integer from 1 to 3 and the sum (a+b+c) is 4; R1, R2 and R3 are alkyl, cycloalkyl or aryl radicals with 1-18 carbon atoms optionally containing heteroatoms.

In some embodiments, the silicon compounds are selected from the group consisting of (tert-butyl)2Si(OCH3)2, (cyclohexyl)(methyl)Si(OCH3)2, (phenyl)2Si(OCH3)2 and (cyclopentyl)2Si(OCH3)2.

In some embodiments, the 1,3-diethers are used as external donors. In some embodiments, when the internal donor is a 1,3-diether, the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, the operation takes place in liquid monomer, producing a quantity of polymer up to 1000 times the weight of the catalyst.

The following examples are given to illustrate and not limit the present disclosure.

EXAMPLES

Characterizations

Xylene-Soluble (XS) Fraction at 25° C.
Solubility in xylene: Determined as follows:
2.5 g of polymer and 250 ml of xylene were introduced in a glass flask equipped with a refrigerator and a magnetic stirrer. The temperature was raised in 30 minutes up to the boiling point of the solvent. The resulting clear solution was then kept under reflux and stirred for 30 minutes. The closed flask was then kept for 30 minutes in a bath of ice and water, then in a thermostatic water bath at 25° C. for 30 minutes. The resulting solid was filtered on quick filtering paper. 100 ml of the filtered liquid was poured in a previously weighed aluminum container, which was heated on a heating plate under nitrogen flow to remove the solvent by evaporation. The container was then kept in an oven at 80° C. under vacuum until a constant weight was obtained. The weight percentage of polymer soluble in xylene at room temperature was then calculated.

The content of the xylene-soluble fraction is expressed as a percentage of the original 2.5 grams and then, by the difference (complementary to 100%), the xylene insoluble percentage (%);

XS of components B) and C) have been calculated by using the formula:

$$XS_{tot} = WaXS_A + WbXS_B + WcXS_C$$

wherein Wa, Wb and Wc are the relative amount of components A, B and C, respectively, and (A+B+C=1).

Melt Flow Rate (MFR)

Measured according to ISO 1133 at 230° C. with a load of 2.16 kg, unless otherwise specified.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter which had a quartz crystal oscillator. The meniscus stopped the counter as the meniscus passed the lower lamp and the efflux time was registered: the efflux time was converted into a value of intrinsic viscosity through Huggins' equation (Huggins, M. L., J. Am. Chem. Soc., 1942, 64, 2716) using the flow time of the pure solvent at the same experimental conditions (same viscometer and same temperature). A single polymer solution was used to determine [η].

Comonomer ($C_2$ and $C_4$) Content

The content of comonomers was determined by infrared (IR) spectroscopy by collecting the IR spectrum of the sample vs. an air background with a Fourier transform infrared spectrometer (FTIR). The instrument data acquisition parameters were:

purge time: 30 seconds minimum
collect time: 3 minutes minimum
apodization: Happ-Genzel
resolution: 2 $cm^{-1}$.

Sample Preparation—

Using a hydraulic press, a thick sheet was obtained by compression molding about 1 g of sample between two aluminum foil sheets. A small portion was cut from the resulting sheet to mold a film. The film thickness was set to have a maximum absorbance of the $CH_2$ absorption band at ~720 $cm^{-1}$ of 1.3 a.u. (% Transmittance>5%). The molding conditions were carried out at a temperature of about 180±10° C. (356° F.) and a pressure of about 10 $kg/cm^2$ (142.2 psi) for about one minute. The pressure was then released. The sample was removed from the press and cooled to room temperature. The spectrum of the pressed film sample was recorded as a function of absorbance vs. wavenumbers ($cm^{-1}$). The following measurements were used to calculate ethylene ($C_2$) and 1-butene ($C_4$) contents:

a) Area ($A_t$) of the combination absorption bands between 4482 and 3950 $cm^{-1}$, which was used for spectrometric normalization of film thickness.

b) Area ($A_{C2}$) of the absorption band due to methylenic sequences ($CH_2$ rocking vibration) in a range of 660-790 $cm^{-1}$ after a proper digital subtraction of an isotactic polypropylene (IPP) and a $C_2C_4$ references spectrum.

c) The factor of subtraction ($FCR_{C4}$) between the spectrum of the polymer sample and the $C_2C_4$ reference spectrum. The reference spectrum was obtained by performing a digital subtraction of a linear polyethylene from a $C_2C_4$ copolymer to extract the $C_4$ band (ethyl group at ~771 $cm^{-1}$).

The ratio $A_{C2}/A_t$ was calibrated by analyzing ethylene-propylene standard copolymers of reference compositions, as determined by NMR spectroscopy.

The assignments of the spectra, triad distribution and composition were made according to Kakugo ("Carbon-13 NMR determination of monomer sequence distribution in ethylene-propylene copolymers prepared with δ-titanium trichloride-diethylaluminum chloride," M. Kakugo, Y. Naito, K. Mizunuma and T. Miyatake, *Macromolecules*, 1982, 15, 1150).

To calculate the ethylene ($C_2$) and 1-butene ($C_4$) content, calibration curves were obtained by using reference samples with ethylene and 1-butene detected by $^{13}C$ NMR.

Calibration for ethylene—A calibration curve was obtained by plotting $A_{C2}/A_t$ versus ethylene molar percent (% $C_{2m}$), and the coefficients $a_{C2}$, $b_{C2}$ and $c_{C2}$ were then calculated via linear regression.

Calibration for 1-butene—A calibration curve was obtained by plotting $FCR_{C4}/A_t$ versus butane molar percent (% $C_4m$), and the coefficients $a_{C4}$, $b_{C4}$ and $C_{C4}$ were then calculated via linear regression.

The spectra of the evaluated samples were recorded and then ($A_t$), ($A_{C2}$) and ($FCR_{C4}$) were calculated.

The ethylene content (% molar fraction $C_{2m}$) of the sample was calculated as follows:

$$\% \ C2m = -b_{C2} + \frac{\sqrt{b_{C2}^2 - 4 \cdot a_{C2} \cdot \left(c_{C2} - \frac{A_{C2}}{A_t}\right)}}{2 \cdot a_{C2}}$$

The 1-butene content (% molar fraction $C_{4m}$) of the sample was calculated as follows:

$$\% \ C4m = -b_{C4} + \frac{\sqrt{b_{C4}^2 - 4 \cdot a_{C4} \cdot \left(c_{C4} - \frac{FCR_{C4}}{A_t}\right)}}{2 \cdot a_{C4}}$$

where $a_{C4}$, $b_{C4}$, $c_{C4}$ $a_{C2}$, $b_{C2}$, $c_{C2}$ are the coefficients of the two calibrations.

Changes from mol % to wt % were calculated by using molecular weights of the compound(s).

Amount (wt %) of comonomer of components A-C were calculated by using the following relationship:

$$Com_{tot} = WaCom_A + WbCom_B + WcCom_C$$

wherein Wa, Wb and We are the relative amount of components A, B and C, respectively, and (A+B+C=1).

$Com_{tot}$, $Com_A$, $Com_B$ and ComC are the amounts of comonomer in the total composition (tot) and in components A-C.

Haze Determination

Films with a thickness of 50 μm were prepared by extruding each test composition in a single screw Dr. Collin extruder (length/diameter ratio of screw: 1:25) at a film drawing speed of 7 m/min and a melt temperature of 210-250° C.

50 μm film specimens were used. The haze value was measured using a Gardner photometric unit connected to a Hazemeter Type UX-10 or an equivalent instrument having a GE 1209 light source with filter "C". Reference samples were used for calibrating the instrument according to ASTM D1003.

Example 1—Preparation of the Polyolefin Composition

Catalyst Precursor:

The solid catalyst component used in the polymerization was a Ziegler-Natta catalyst component supported on magnesium chloride ($MgCl_2$) containing titanium and diisobutylphthalate as an internal donor. An initial amount of microspheroidal $MgCl_2.2.8C_2H_5OH$ was prepared according to Example 2 of U.S. Pat. No. 4,399,054, but operating at 3,000 rpm instead of 10,000 rpm. The resulting adduct was subjected to thermal dealcoholation at increasing temperatures from 30-130° C. in a nitrogen current until the molar alcohol content per mol of Mg was about 1.16. Into a 1000 mL four-necked round flask, purged with nitrogen, 500 mL of $TiCl_4$ were introduced at 0° C. While stirring, 30 grams of the microspheroidal $MgCl_2.1.16C_2H_5OH$ adduct were added. The temperature was raised to 120° C. and kept for 60 minutes. During the temperature increase, an amount of diisobutylphthalate was added to produce a Mg/diisobutylphthalate molar ratio of about 18. After 60 minutes, stirring was stopped, the liquid was siphoned off and the treatment with TiCl4 was repeated at 100° C. for 1 hour in the presence of an amount of diisobutylphthalate to produce a Mg/diisobutylphthalate molar ratio of about 27. The stirring was then stopped, the liquid was siphoned off and the treatment with $TiCl_4$ was repeated at 100° C. for 30 min. After sedimentation and siphoning at 85° C., the solid was washed six times with anhydrous hexane (6×100 ml) at 60° C.

Catalyst System and Prepolymerization:

Before introducing the solid catalyst component into the polymerization reactors, the solid catalyst component was contacted at 30° C. for 9 minutes with aluminum triethyl (TEAL) and dicyclopentyldimethoxysilane (DCPMS) at a TEAL/DCPMS weight ratio of about 15 and in such quantity that the TEAL/solid catalyst component weight ratio was about 4.

The catalyst system was then subjected to prepolymerization by maintaining the catalyst system in a liquid propylene suspension at 50° C. for about 75 minutes before introducing the catalyst system into the first polymerization reactor.

Polymerization

The polymerization was carried out in continuous mode in a series of three gas-phase reactors equipped with devices to transfer the product from the first reactor to the second one. A propylene-based polymer (A) was produced in the first gas phase polymerization reactor by feeding the prepolymerized catalyst system, hydrogen (the molecular weight regulator) and propylene, in a gas state, in a continuous and constant flow. The propylene-based polymer (A) coming from the first reactor was discharged in a continuous flow and, after having been purged of unreacted monomers, was introduced, in a continuous flow, into the second gas phase reactor, together with quantitatively constant flows of hydrogen and ethylene, in a gas state. In the second reactor, a copolymer of ethylene (B) was produced. The product coming from the second reactor was discharged in a continuous flow and, after having been purged of unreacted monomers, was introduced, in a continuous flow, into the third gas phase reactor, together with quantitatively constant flows of hydrogen, ethylene and propylene, in a gas state. In the third reactor, an ethylene-propylene polymer (C) was produced. Polymerization conditions, molar ratio of the reactants and compositions of the resulting copolymers are shown in Table 1. The polymer particles exiting the third reactor were subjected to a steam treatment to remove the reactive monomers and volatile substances and then dried. Thereafter, the polymer particles were mixed with a stabilizing additive composition in a twin screw extruder Berstorff ZE 25 (length/diameter ratio of screws: 34) and extruded under a nitrogen atmosphere in the following conditions:

Rotation speed: 250 rpm;
Extruder output: 15 kg/hour;
Melt temperature: 245° C.

The stabilizing additive composition was made of or contained the following components:
- 0.1% by weight of Irganox® 1010;
- 0.1% by weight of Irgafos® 168; and
- 0.04% by weight of DHT-4A (hydrotalcite);

where the percentage amounts refer to the total weight of the polymer and stabilizing additive composition.

Irganox® 1010 is 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzene-propanoate, and Irgafos® 168 is tris(2,4-di-tert.-butylphenyl)phosphite. The characteristics of the polymer composition, reported in Table 2, were obtained from measurements carried out on the extruded polymer, which constituted a stabilized ethylene polymer composition.

TABLE 1

| Polymerization conditions | | | |
|---|---|---|---|
| Example | | | 1 |
| 1st Reactor - component (A) | | | |
| Temperature | | ° C. | 60 |
| Pressure | | barg | 16 |
| $H_2/C_3$- | | mol. | 0.24 |
| Split | | wt % | 22 |
| Xylene soluble of (A) ($XS_A$) | | wt % | 4.2 |
| MFR of (A) | | g/10 min | 110 |
| 2nd Reactor - component (B) | | | |
| Temperature | | ° C. | 80 |
| Pressure | | barg | 18 |
| $H_2/C_2$- | | mol. | 0.81 |
| $C_4$-/($C_2$- + $C_4$-) | | mol. | 0.25 |
| $C_2$-/($C_2$- + $C_3$-) | | mol. | 0.98 |
| Split | | wt % | 32 |
| $C_2$- content of B * | | wt % | 90 |
| $C_4$- content of B * | | wt % | 10 |
| Xylene soluble of B ($XS_B$) * | | wt % | 16.0 |
| Xylene soluble of (A + B) | | wt % | 12.0 |
| MFR of (A + B) | | g/10 min. | 35.9 |
| 3rd Reactor - component (C) | | | |
| Temperature | | ° C. | 65 |
| Pressure | | barg | 18 |
| $H_2/C_2$- | | mol. | 0.17 |
| $C_2$-/($C_2$- + $C_3$-) | | mol. | 0.42 |
| Split | | wt % | 46 |
| $C_2$- content of C * | | wt % | 52 |
| Xylene soluble of (C) ($XS_C$) * | | wt % | 83 |

Notes:
$C_2$- = ethylene (IR);
$C_3$- = propylene (IR);
$C_4$- = 1-butene (IR);
split = amount of polymer produced in the concerned reactor.
* Calculated values.

The features of the polymer of Example 1 are reported in Table 2.

TABLE 2

| Example | | 1 |
|---|---|---|
| component A | | |
| $C_2$ content | wt % | 0 |
| XSA | wt % | 4.2 |
| MFR | g/10 min | 110 |
| split | wt % | 22 |
| component B | | |
| XSB* | wt % | 16 |
| $C_2$ content* | wt % | 90.0 |
| $C_4$ content* | wt % | 10.0 |
| split | wt % | 32 |
| MFR of (A + B) | g/10 min | 35.9 |
| Component C | | |
| XSC* | wt % | 83 |
| $C_2$ content* | wt % | 52 |
| split | wt % | 46 |
| total composition | | |
| MFR | g/10 min | 1.61 |
| IV on soluble in Xylene | dl/g | 2.4 |

$C_2$ = ethylene;
$C_4$ = 1-butene;
*calculated

Comparative Example 2 was a random propylene ethylene copolymer sold by LyondellBasell Industries under the tradename Clyrell® RC1890.

Comparative Example 3 was a commercial product sold under the tradename Adflex® Q100F by LyondellBasell Industries.

Multilayer Blow Film

A/B/A blow films were produced by using the polymers of Example 1 and Comparative Examples 1-3. The thickness of the films was 12 microns, with the A layer being 3 microns and the B layer being 6 microns. The results of the analysis of the films are reported in Table 3.

TABLE 3

| | Film 1 | Film 2 | Film 3 |
|---|---|---|---|
| layer A | Comp. Ex. 2 | Comp. Ex. 2 | Comp. Ex. 2 |
| layer B | Ex. 1 | Comp. Ex. 2 | Comp. Ex. 3 |
| layer A | Comp. Ex. 2 | Comp. Ex. 2 | Comp. Ex. 2 |
| haze % on film | 2.4 | 15.1 | 27.9 |

What is claimed is:

1. A multilayer film comprises:
at least one layer comprising
a polyolefin composition comprising
A) 5-30% by weight, based upon the total weight of the polyolefin composition, of a propylene homopolymer or a propylene ethylene copolymer containing 90% by weight or more of propylene units; component (A) containing 10% by weight or less of a fraction soluble in xylene at 25° C. ($XS_A$), both the amount of propylene units and of the fraction $XS_A$ being referred to the weight of (A);
B) 20-50% by weight, based upon the total weight of the polyolefin composition, of a copolymer of ethylene and a $C_3$-$C_8$ alpha-olefin containing from 0.1% to 20% by weight of alpha-olefin units and containing 25% by weight or less; of a fraction soluble in xylene at 25° C. ($XS_B$), both the amount of alpha-olefin units and of the fraction $XS_B$ being referred to the weight of (B); and
C) 30-60% by weight, based upon the total weight of the polyolefin composition, of a copolymer of ethylene and propylene containing from 25% to 75% by weight of ethylene units and containing from 40% to 95% by weight of a fraction soluble in xylene at 25° C. ($XS_C$), both the amount of ethylene units and of the fraction $XS_C$ being referred to the weight of (C);

wherein the amounts of (A), (B) and (C) being referred to the total weight of (A)+(B)+(C), the sum of the amount of (A)+(B)+(C) being 100.

2. The multilayer film according to claim 1, wherein

Component A ranges from 10% by weight to 30% by weight;

Component B ranges from 25% by weight to 45% by weight; and

Component C ranges from 35% by weight to 55% by weight.

3. The multilayer film according to claim 1, wherein

Component A ranges from 15% by weight to 25% by weight;

Component B ranges from 30% by weight to 40% by weight; and

Component C ranges from 40% by weight to 50% by weight.

4. The multilayer film according to claim 1, wherein component A) is a polypropylene homopolymer.

5. The multilayer film according to claim 1, wherein component B) is a copolymer of ethylene and a $C_3$-$C_8$ alpha-olefin containing from 5% to 15% by weight of alpha-olefin units.

6. The multilayer film according to claim 1, wherein component C) is a copolymer of ethylene and propylene containing from 37% to 65% by weight of ethylene units.

7. The multilayer film according to claim 1, wherein component (A) has a melt flow rate (230° C./2.16 kg) ranging between 50 and 200 g/10 min.

8. The multilayer film according to claim 1, wherein component (B) has the melt flow rate (230° C./2.16 kg) ranging between 0.1 and 70 g/10 min.

9. The multilayer film according to claim 1, wherein the polyolefin composition has a melt flow rate (230° C./2.16 kg) between 0.5 to 25 g/10 min.

10. The multilayer film according to claim 1, wherein the at least one layer is a core.

11. The multilayer film according to claim 1, having from 3 to 11 layers.

12. The multilayer film according to claim 1, having an A/B/A or A/B/C structure wherein the B component is the polyolefin composition of claim 1.

13. The multilayer film according to claim 1, being a bioriented film.

14. The multilayer film according to claim 1, being a blown film.

15. The multilayer film according to claim 1, being a blown film having a thickness lower than 30 microns.

* * * * *

UNITED STATES PATENT AND TRADEMARK OFFICE
CERTIFICATE OF CORRECTION

| | | |
|---|---|---|
| PATENT NO. | : 10,882,287 B2 | Page 1 of 1 |
| APPLICATION NO. | : 16/613635 | |
| DATED | : January 5, 2021 | |
| INVENTOR(S) | : Perdomi et al. | |

It is certified that error appears in the above-identified patent and that said Letters Patent is hereby corrected as shown below:

On the Title Page

Column 1, Item (30), Line 1, delete "17172379" and insert -- 17172379.4 --, therefor In the Claims In Column 10, Claim 1, Line 60, delete "or less;" and insert -- or less --, therefor
In Column 12, Claim 10, Line 14, delete "core." and insert -- core layer. --, therefor Signed and Sealed this
Twenty-fourth Day of January, 2023

Katherine Kelly Vidal
*Director of the United States Patent and Trademark Office*